J. Leach,

Tea Cup Cover.

No. 110,148.    Patented Dec. 13, 1870.

Witnesses                            Inventor
                                     Joseph Leach

United States Patent Office.

JOSEPH LEACH, OF NEW HARMONY, INDIANA.

Letters Patent No. 110,148, dated December 13, 1870; antedated December 6, 1870.

IMPROVEMENT IN COVERS FOR TEA AND COFFEE-CUPS.

The Schedule referred to in these Letters Patent and making part of the same.

*To all whom it may concern:*

Be it known that I, JOSEPH LEACH, of New Harmony, in the county of Posey, and in the State of Indiana, have invented certain new and useful Improvements in Cover for Tea and Coffee-Cups; and do hereby declare that the following is a full, clear, and exact description thereof, reference being had to the accompanying drawing and to the letters of reference marked thereon making a part of this specification.

The nature of my invention consists in the construction of a "cover for tea and coffee-cups" designed to prevent house-flies from getting into the cup.

In order to enable others skilled in the art to which my invention appertains to make and use the same, I will now proceed to describe its construction and operation, referring to the annexed drawing, in which—

Figure 1 is a perspective view of a cup with my cover on.

A represents a tea-cup, upon which is placed the concave perforated cover B, provided with a ledge or rim, $a$, around its circumference.

Figure 1:
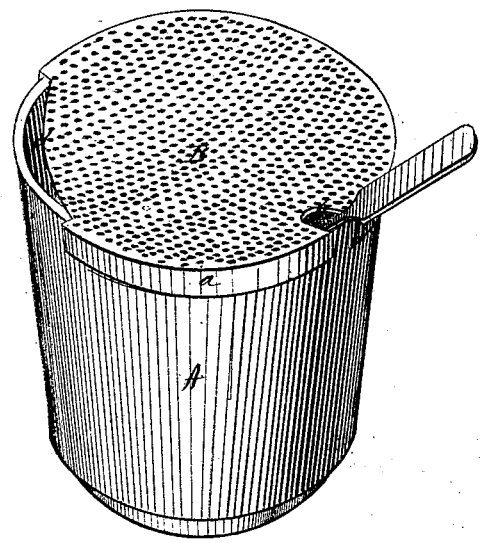
Figure 2:
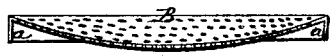
Figure 2 is a vertical section of the cover.

The cover B and rim $a$ are cut out with a semicircular opening, $b$, and a larger opening, $d$, as shown in fig. 1.

When flies become bad or plenty in the warm season they are very troublesome at the table, and a person sees and feels the want of a convenient cover for the cup to keep the flies from getting in the tea or coffee. A fly often falls in the cup after the beverage has been poured out and sweetened ready for use; this then has to be thrown out, a total waste, and another cupful is poured out, which is subjected to the danger of being wasted, too. This, every one knows, is a very nasty annoyance while at the table.

By the use of my invention the tea or coffee may be poured out, the teaspoon placed in the cup as usual, and then the cover put on, when there will be no trouble with the flies dropping into the cup.

Other covers are in use for other kinds of dishes used at the table, but nothing for this purpose. It is designed exclusively for tea and coffee-cups. It is so constructed that a person can easily remove it when necessary.

The upper side is made concave, for the purpose of drinking without inconvenience or without moving the cover. If made level, having no concave or dished form, it would be difficult to drink out of the cup with the cover on, but this is overcome by its concave shape.

The small semicircular opening $b$ on the right edge is to allow the teaspoon to remain in the cup as usual.

The other opening $d$ on the front edge is for the purpose of drinking from the cup, or to pour out the tea or coffee without removing the cover.

The small ledge or rim $a$, extending partially round the cover, is to clamp the outer surface of the cup and the cover more firmly to its place.

These covers can be made of any kind of material, light sheet metal, wire, glass, or porcelain, as may be desired.

Having thus fully described my invention,

What I claim as new, and desire to secure by Letters Patent, is—

As a new article of manufacture, the concave perforated cover B, provided with ledge or rim $a$ and openings $b$ $d$, substantially as and for the purposes herein set forth.

In testimony that I claim the foregoing I have hereunto set my hand this 19th day of May, 1870.

JOSEPH LEACH.

Witnesses:
WM. T. COLLINS,
JAMES RILEY COLLINS.